United States Patent
Gerres et al.

(10) Patent No.: US 6,945,553 B1
(45) Date of Patent: Sep. 20, 2005

(54) PRESSURE HITCH

(76) Inventors: Ronald F. Gerres, 109 Hillcrest Dr., Belle Plaine, MN (US) 56011; Steven M. Gerres, 1009 W. Main St., Belle Plaine, MN (US) 56011

( * ) Notice: Subject to any disclaimer, the term of this patent is extended or adjusted under 35 U.S.C. 154(b) by 0 days.

(21) Appl. No.: 10/975,633

(22) Filed: Oct. 28, 2004

(51) Int. Cl.7 ............................................... B60D 1/04
(52) U.S. Cl. ..................... 280/511; 280/415.1; 414/680
(58) Field of Search ....................... 280/511, 514, 515, 280/504, 508; 414/680, 685; 280/415.1

(56) References Cited

U.S. PATENT DOCUMENTS

| | | | |
|---|---|---|---|
| 3,826,517 A | 7/1974 | Hunger | |
| 3,827,724 A | 8/1974 | Ackley | |
| 4,015,855 A * | 4/1977 | Murray | 280/416.2 |
| 4,148,499 A | 4/1979 | Johnson | |
| 4,431,207 A * | 2/1984 | Langenfeld et al. | 280/416.2 |
| 4,482,166 A | 11/1984 | Van Antwerp | |
| 4,677,930 A | 7/1987 | Ortloff | |
| 5,730,227 A * | 3/1998 | Hund | 172/439 |
| 5,971,493 A | 10/1999 | Robert | |
| 6,047,982 A | 4/2000 | McClure et al. | |
| 6,604,752 B1 | 8/2003 | Gerres et al. | |
| 6,837,510 B1 * | 1/2005 | Karls | 280/416.1 |

* cited by examiner

*Primary Examiner*—Tony Winner
(74) *Attorney, Agent, or Firm*—R. C. Baker & Associates, Ltd.

(57) ABSTRACT

The pressure hitch is operable from the cab of a towing vehicle. The towing vehicle is equipped with a basic ball hitch and a vertically orientable hydraulically operated ram having a rubber pressure stub at its lowermost end in an orientation above the basic ball hitch. The towed vehicle has an inverted cup-shaped socket for coupling (without need for grip tightening) on the basic ball hitch. The ram's rubber pressure stub is vertically movable for pressing against the upper outer surface of the socket and is the sole structure for holding the socket and basic ball hitch together during towing operations. The ideal towing vehicle is a front end loader.

15 Claims, 3 Drawing Sheets

PRESSURE HITCH

FIELD OF THE INVENTION

This invention relates to a pressure hitch operable from the cab of a towing vehicle, and more particularly to the use of remotely controlled pressure to hold hitch components between a towing and towed vehicle against separation.

BACKGROUND OF THE INVENTION

Rapid hitching and unhitching of towable vehicles from towing vehicles with maximum convenience (i.e., minimal labor) has become more and more critical as towable vehicles have proliferated and the operators/proprietors of businesses dealing with towable vehicles for rent or sale have recognized that attractive aligned display of towable vehicles has a salutary effect in attracting customers. Rapid hitching and unhitching with maximum convenience also is important for businesses having a multitude of different towable implements and for operators who have every desire to avoid getting in and out of the cab of a towing vehicle to secure and release each hitch connection. In short, rapid hitching and unhitching operations are much sought after by a multitude of resort owners, boat dealers, inland marina operators, camper dealers, dealers in anhydrous tanks, agricultural implements, trailer rentals for household goods, as well as for trailer rentals for motor cycles, snowmobiles, racing cars, etc. Further, rapid remotely controlled hitching and unhitching is important where augers or other other towable equipment items are to be shifted to different locations in handling fungible and other goods.

U.S. Pat. No. 6,604,752 issued Aug. 12, 2003 to inventors Ronald F. and Steven M. Gerres does provide one solution for accomplishing rapid hitching and unhitching of a towable vehicle and a towing vehicle while an operator remains in the cab of the towing vehicle; but the solution in that patent concentrates on hitch connections where a pin extends through a hole in the draw bar of the towing vehicle and a hole in the tongue of a towable vehicle. That approach is not useful where a ball hitch arrangement is on the towing vehicle and an inverted cup-shaped socket hitch arrangement is on the towable vehicle.

Over 30 years ago a cab-controlled ball and socket hitching connection was patented by Deere & Company of Moline, Ill.; see George Dwight Hunter U.S. Pat. No. 3,826,517 of Jul. 30, 1974. That patent uses a pick-up bale in the form of a flexible chain suspended from draft links of a tractor and a pick-up hook on the upper surface of a ball engagement inverted socket on the tongue of a towable implement. The chain on the tractor is wiggled under the hook on the implement to align the socket of the implement over the ball hitch on the draw bar of a tractor—a result that can be difficult and even clumsy to accomplish. Then a hydraulically controlled keeper is moved horizontally to hold the socket on the ball hitch. A similar Deere & Company 1974 patent has a pivotable keeper; see John William Ackley U.S. Pat. No. 3,827,724 of Aug. 6, 1974. The design of the ball hitch as well as the inverted socket of the tongue must be standardized in order for the specially contoured keepers of these two patents to maintain the socket in an engaged condition on the ball hitch. The teaching of these 1974 patents has not received a great deal of attention in the practical world, possibly because the only place they really become practical is where the implement and the tractor are always equipped with components of uniform design in order to achieve reliable hitching. Unfortunately, ball and socket hitching components are not routinely of the same matching size and style of design. Different manufacturers vary the size and shape of ball and socket components. The variations have militated against dreams of universal ball and socket cab-controlled hitching and unhitching, and have frustrated operators into the practice of departing from the cab of a towing vehicle to attend to tightening each special cup-shaped socket into a gripping relationship on a suitable previously selected ball on the towing vehicle.

In short, a convenient and universally operable and reliable technique for easily accomplishing engagement and disengagement of a variety of sizes and shapes of inverted cup-shaped sockets on a ball hitch by an operator of a towing vehicle without dismounting from the cab of the towing vehicle has been much desired, but never heretofore accomplished despite the extraordinary popularity of ball and inverted socket hitching. This invention directs itself to a solution to the problem and presents the art with a convenient and universally operable and reliable technique for engagement and disengagement of inverted sockets of varied sizes and shapes on a basic ball hitch without need for an operator to dismount from the cab of a towing vehicle to accomplish the engagement and disengagement of the components.

SUMMARY OF THE INVENTION

The invention provides a hitch assembly that permits an operator to pressure couple a towable vehicle to a towing vehicle while the operator remains in the cab of the towing vehicle. In essence, the towing hitch arrangement on the towing vehicle consists essentially of a ball hitch (i.e., a basic ball hitch) and a vertically orientable hydraulically operated ram assembly having a hydraulic ram equipped with a rubber pressure stub at its lowermost end in an orientation above the basic ball hitch for hydraulic movement of the rubber pressure stub vertically toward and away from the basic ball hitch.

Extraordinary variation of size and shape are allowable for the towed hitch arrangement on the towable vehicle. Fundamentally, the towed hitch arrangement consists essentially of an inverted cup-shaped socket for coupling on the basic ball hitch, but the size and shape of the socket are not critical for matching to the basic ball hitch. The socket has an upper outer surface, but that upper outer surface can vary at will. The ram's rubber pressure stub is adapted to be vertically moved toward and pressed against the upper outer surface of the inverted cup-shaped socket to hold that cup-shaped socket on the basic ball hitch without scratching the upper outer surface of the socket regardless of the contour of that upper outer surface and regardless of pivot movement of the upper outer surface against the rubber pressure stub during towing operations.

There is no need for any tightening of the cup-shaped socket to form a grip about the basic ball hitch; and the size of the cup-shaped socket, while it must have an internal diameter greater than the diameter of the basic ball hitch, can vary into larger sizes that would not normally be allowable or useful for a hitching arrangement between a cup-shaped socket and a ball hitch. However, the internal diameter of the cup-shaped socket will preferably not be greater than about two times the diameter of the basic ball hitch. Direct vertical application of pressure by the rubber pressure stub on the upper outer surface of the cup-shaped socket constitutes the sole feature for holding the cup-shaped socket against separation from the basic ball hitch.

Ideally, the rubber pressure stub resists compression in excess of 20 percent in the vertical direction. It preferably is of synthetic rubber, although natural rubber is useful. The most ideal synthetic rubber is in the neoprene family. The rubber pressure stub should have a transverse width in all directions transverse to its vertical movement of at least about 3/8 inch. The greatest transverse width usually will not exceed about two inches. While a greater transverse width (e.g., diameter) for the rubber pressure stub can be useful, it is normally unnecessary, and thus the added expense of greater width can be avoided. The length of the rubber pressure stub in the vertical direction (i.e., the longitudinal or axis direction of the vertical movement of the ram) can be relatively short (e.g., as little as 1/8 inch) but adequate to cushion the contact with the upper outer surface of the cup-shaped socket. Ideally, the length of the rubber stub will be at least 1/4 inch and can be as great as several inches (e.g., usually not over about two inches), but a cushion length greater than about one inch is generally unnecessary.

Several other advantages and features can be incorporated into the new hitching arrangement. For example, the basic ball hitch as well as the cup-shaped socket may optionally be removable to allow other hitching arrangements to be employed on the towing and towable vehicles. (Such optional other arrangements may use a pin through a hole in the draw bar of the towing hitch arrangement and a hole in the tongue of a towable vehicle.) Further, additional hitching arrangements may optionally be incorporated or added on the towable and towing vehicles.

The most ideal hitching assembly for a towing vehicle is one where the basic ball hitch is on a draw bar extending outward from one face of a vertically orientable base plate having opposite face sides, and where the vertically orientable hydraulically operated ram assembly is one having a hydraulic cylinder end equipped with a terminal structure by which the ram assembly is vertically suspended from the elevated outer end of a boom rigidly united at its inner end to the one face side of the base plate from which the draw bar extends. A mid-level bracing structure for holding the ram assembly in stable condition for hydraulic movement of the rubber pressure stub vertically toward and away from the basic ball hitch is desirable.

An ideal towing vehicle for the invention is a front-end loader, especially one equipped with a toe-heel attachment carrier to which the vertically orientable base plate having opposite face sides as above-mentioned can be mounted. This approach permits great convenience for tilting the towing hitch arrangement as well as for horizontal and vertical movement of it relative to an inverted socket on the tongue of a towable vehicle. As a consequence, the basic ball hitch of the towing vehicle can easily be oriented under (and even into) the inverted cup-shaped socket on the tongue of the towable vehicle. Tongues of towable vehicles are nowadays usually equipped with a depending foot to keep them above ground level a short distance so as to permit easy movement of a basic ball hitch on a towing vehicle into the inverted socket. Thereafter, vertical movement of the rubber pressure stub of the hydraulically operated ram assembly into a pressed condition against the upper outer surface of the inverted cup-shaped socket is easily accomplished to hold the cup-shaped socket in coupled relationship on the basic ball hitch without need to tighten the cup-shaped socket to form a grip about the basic ball hitch.

Still other benefits and advantages of the invention will become evident as this description proceeds.

DETAILED DESCRIPTION OF THE INVENTION

Figure 1:
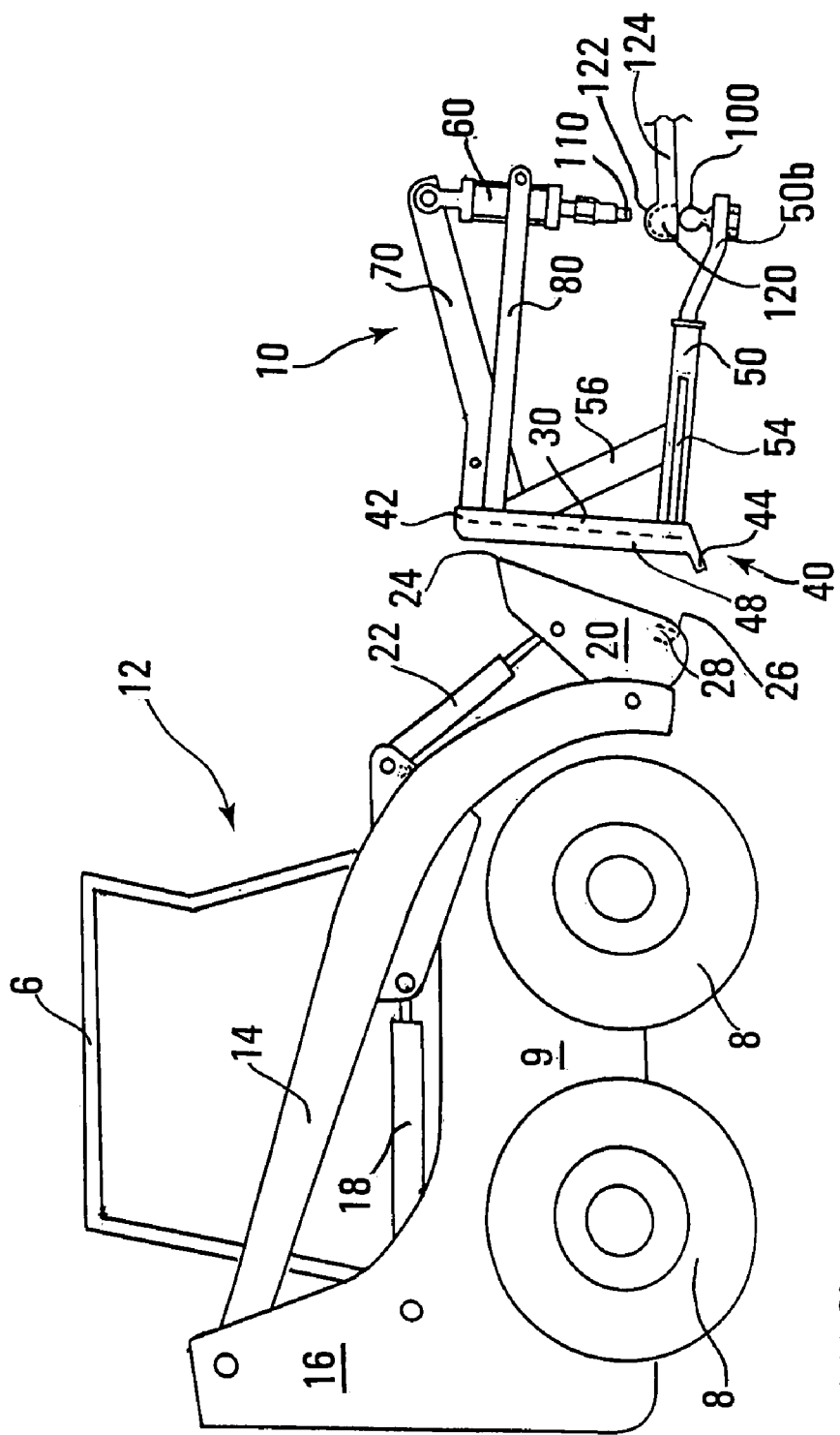
FIG. 1 is a schematic side view of the pressure hitch of the invention and particularly illustrates a towing hitch arrangement (shown in readiness for mounting to a towing vehicle such as a front-end loader) and a spaced towed hitch arrangement (shown with only a tongue fragment of the towable vehicle as part of the illustration)
Figure 2:
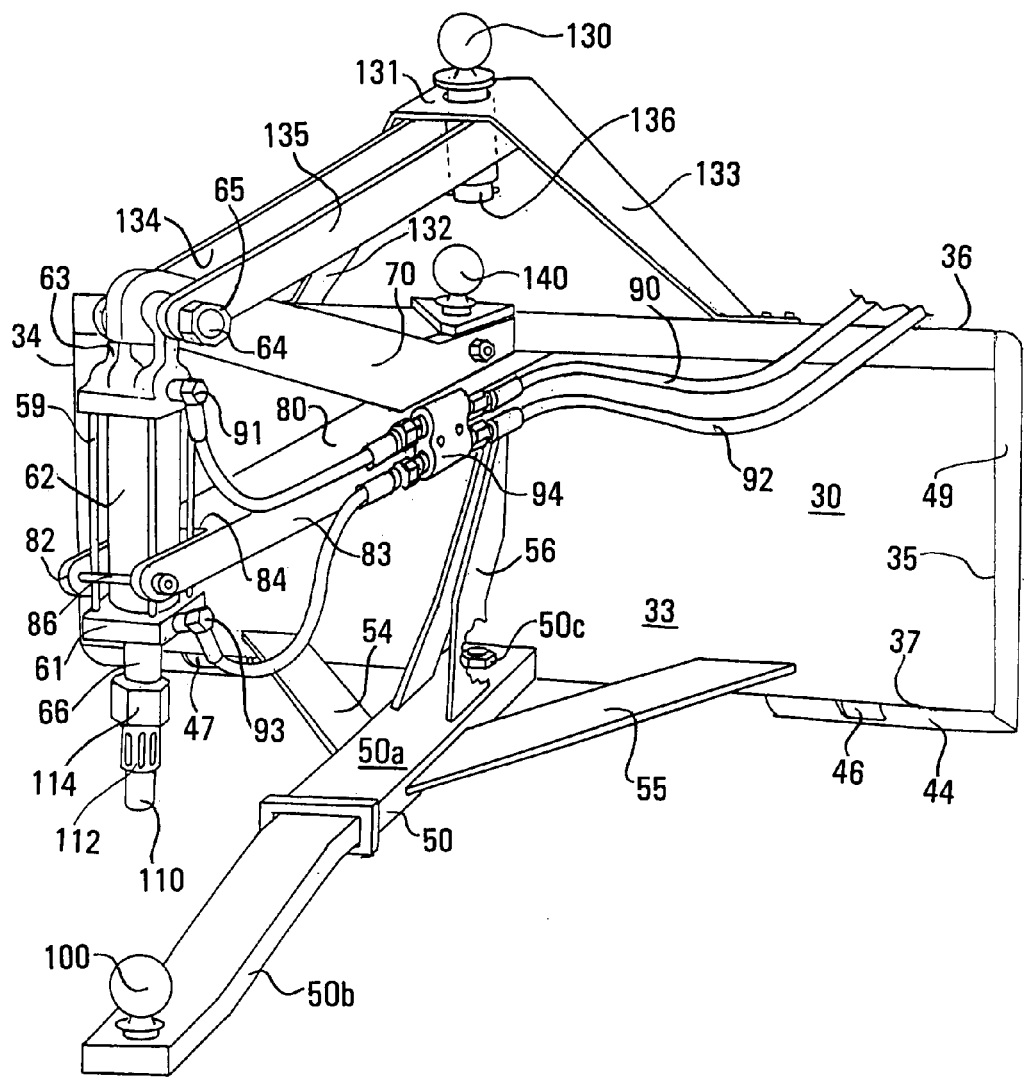
FIG. 2 is a schematic perspective view of the towing vehicle hitch arrangement for the pressure hitch; also shown are optional added hitch arrangements for the towing vehicle.
Figure 3:
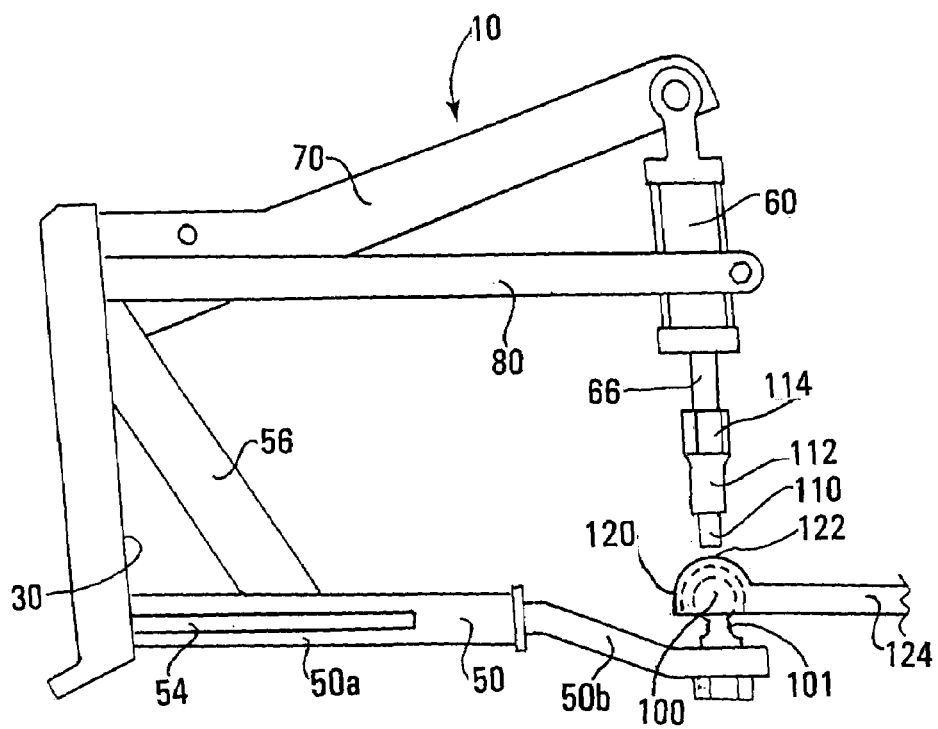
FIG. 3 is an enlarged schematic side view of the pressure hitch of the invention and schematically illustrates the relationship of components for the pressure coupling of the inverted cup-shaped socket of the towable vehicle onto the ball hitch of the towing vehicle by the rubber pressure stub bearing vertically down for contact on the outer upper surface of the socket.

Referring particularly to FIGS. 1, 2, and 3, the new hitch assembly of the invention permits an operator to pressure-couple a towable vehicle 124 to a towing vehicle 12 while the operator remains in the cab 6 of the towing vehicle. The towable vehicle 124 is illustrated in the drawings solely by the tongue of it. Greater detail for the towable vehicle is believed unnecessary. The variety of possibilities for towable vehicles is almost endless.

The towing vehicle has a towing hitch arrangement 10 that requires a ball hitch 100 (herein referred to as the basic ball hitch) and a vertically orientable hydraulically operated ram assembly 60 having a hydraulic ram equipped with a rubber pressure stub 110 at its lowermost end in an orientation above the basic ball hitch for hydraulic movement of the rubber pressure stub vertically toward and away from the basic ball hitch.

The towable hitch arrangement consists essentially of an inverted cup-shaped socket 120 for coupling on the basic ball hitch. The socket has an upper outer surface 122. The ram's rubber pressure stub 110 is adapted to be vertically moved toward and pressed against the upper outer surface 122 of the inverted cup-shaped socket. That action holds the cup-shaped socket on the basic ball hitch 100 without scratching the upper outer surface regardless of the contour of that upper outer surface and regardless of pivot movement of that upper outer surface against the rubber pressure stub during towing operations. There is no need for any tightening of the cup-shaped socket to form a grip about the basic ball hitch. (Such cup-shaped sockets have internal segments that normally must be tightened against portions of the ball hitch below its equator and adjacent portions of its neck 101; neck 101 is identified in FIG. 3.) The direct vertical application of pressure by the rubber pressure stub on the upper outer surface of the cup-shaped socket constitutes the sole feature for holding the cup-shaped socket against separation from the basic ball hitch.

An interesting feature of the structure is that the cup-shaped socket 120 can have an internal diameter much greater than the external diameter of the basic ball hitch. Indeed, the internal diameter of the cup-shaped socket accessible for the basic ball hitch can be as much as about two times (or possibly even three times) greater than the outer diameter of the basic ball hitch. There need not be an exact match of the cup-shaped socket to the ball hitch, and this alone permits an astonishing variety of cup-shaped sockets that can be coupled over a basic ball hitch by practice of the invention. (This is because the cup-shaped sockets never need to be tightened on the basic ball hitch by moving internal segments of the socket into clamping condition on the basic ball hitch). As an illustration, a popular diameter for ball hitches is about 1⅞ inches; but many ball hitches are 2 inches or more in diameter (and sockets must be of corresponding size for proper clamping of them on standard ball hitches). A diameter of 1⅞ inches is widely useful as the basic ball hitch on the towing vehicle in practicing the invention, and the inverted cup-shaped socket on the towable vehicle only needs to have an entry diameter and internal diameter at least great enough to be fitted over the 1⅞ inch diameter ball and can conveniently have entry and internal diameters even as great as about twice the diameter of the basic ball hitch selected for the towing vehicle.

The ideal type of rubber for the rubber pressure stub is preferably one useful for the manufacture of rubber tires. The reason for selecting tire-type rubber is because the preferred rubber should be relatively tough and solid or hardenable sufficiently to resist significant compression—and clearly resist any compression in excess of 20 percent of its body mass in the vertical direction for the pressure stub. Indeed, the most ideal rubber for the pressure stub will resist compression in excess of 5 percent in the vertical direction. The test pressure for determining resistance to compression is 100 pounds of force. Actually such a force is in excess of that needed to prevent separation of the socket from the ball under most user conditions; but the actual amount of force can vary under practical user conditions, and a force of 100 pounds is reasonable as a standard. Porous or foamed rubbers are not ideal for the rubber stub. The type of rubber best chosen can vary from natural rubber to any of the synthetic rubbers that possess the toughness and hardening characteristics that resemble the rubber of automobile tires. Neoprene rubbers (i.e., the neoprene rubber family that resists oil and soil deterioration) as commonly used in the manufacture of automobile tires are the more ideal rubbers for the rubber pressure stub.

The rubber pressure stub 110 need not perform as a pin that extends through holes (as is common for hitch coupling of a towing draw bar and a towed tongue equipped with matching holes to be united by a pin). Because the stub need not perform as a pin, great variation is allowed for the shaping of the rubber pressure stub. Ideally, the transverse width of the stub in all directions transverse to the vertical length of the stub should fall between about ⅜ inch and two inches, but preferably is not over about one inch for most applications of the invention. The lower limit of ⅜ inch is about as small as possible while retaining the structural strength for vertical pressure against the upper surface of an inverted socket. The upper limit (e.g., preferably about one inch) should be ample but generally only as large as necessary for the pressure function of the stub on the upper outer surface of the inverted socket. The needless additional expense of greater bulk should be avoided. Ideally, the stub 110 is cylindrical in horizontal cross-section and is pressed into a metal sleeve 112 extending vertically downward and in united condition to a threaded nut 114 removably attached to the threaded lowermost end of a metal hydraulic ram 66 (see FIG. 2). The vertical length of the stub as a projection beyond the lowermost end of the metal sleeve of the ram assembly should be at least ⅛ inch and preferably will be at least about ⅜ inch up to as much as about 1½ inch, although stubs in excess of a projection of about one inch beyond the metal of the ram assembly are unnecessary.

Figure 4:
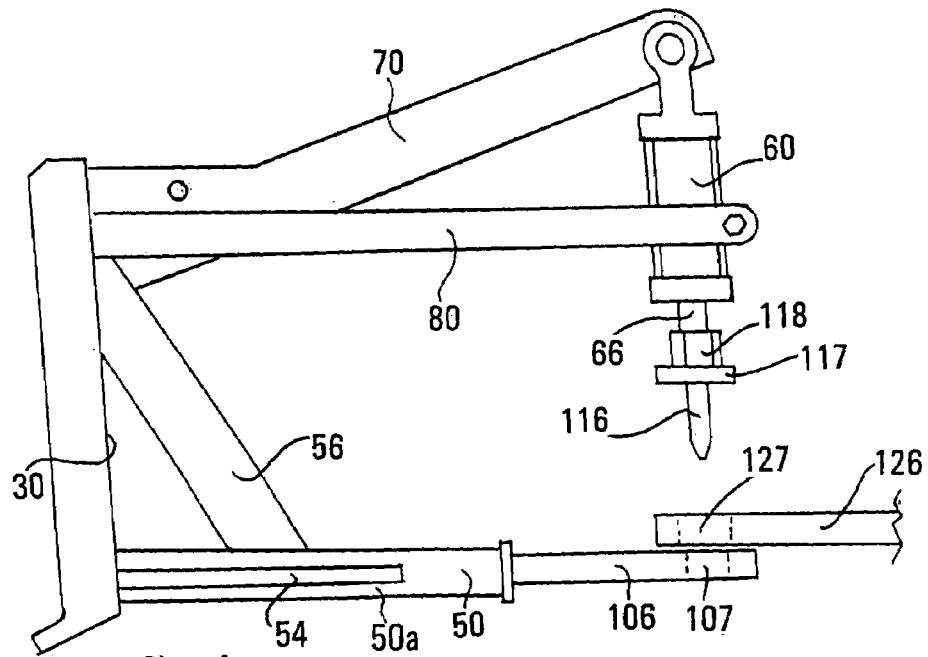
FIG. 4 is a schematic side view of an optional alternative hitch arrangement where the basic ball hitch and rubber pressure stub of the towing vehicle as well as the socket of the towed vehicle are replaced by other hitch components.

While a pin function for the rubber pressure stub 110 is not expected or required, a pin function can be an optional feature. For example, the basic ball hitch may be removable from the towing vehicle (or the draw bar carrying the basic ball hitch may be removed), and a draw bar 106 equipped with a coupling hole 107 may be maintained on the towing vehicle (see FIG. 4). Further, the tongue 126 of a towable vehicle may be equipped with a hole 127. The hole of the tongue may be coupled with the hole on the draw bar by employing the rubber pressure stub 110 as a pin to join the parts together. However, as shown in FIG. 4, it is preferred to use metal as a coupling pin 116 so as to reduce the chance of shearing a rubber pressure stub during towing operations. Also as shown in FIG. 4, the coupling pin 117 (if provided as an alternative) is suitably provided with a stop collar 117 and is threaded onto the lower threaded end of ram 66 by a threaded nut 118.

The most ideal towing vehicle for practice of the invention will now be discussed and its advantages explained for this invention.

Front end loaders 12 are preferred as the towing vehicle. Such loaders characteristically have wheels 8 on opposite sides of a body 9. The wheels are driven independently in that one side can be driven at a different speed from the other side so as to turn the loader in a manner commonly called skid steering. The cab 6 or operator's compartment has an assembly on each side of it that includes a lift arm 14 pivotably mounted to a stanchion 16 at the rear, and a hydraulic ram 18 pivotably mounted at its ends to the stanchion and to the lift arm. An attachment carrier 20 is pivotably mounted at its lower end on the lift arm at its curved lower end and is angularly adjustable by a hydraulic ram 22 pivotably mounted at its ends to an upper portion of the lift arm and an upper portion of the attachment carrier. Illustrative key features for the attachment carrier can take a variety of structural forms, as well known in the art and as, for example, illustrated in U.S. Pat. No. 3,753,508 of Aug. 21, 1973 to Carpenter, and U.S. Pat. No. 3,984,016 of Oct. 5, 1976 to Kuhn and assigned to Clark Equipment Company, both of which are here incorporated by reference. In essence, the attachment carrier has a toe-like structure 24 at its upper edge and a heel-like structure 26 at its lower edge, and a pair of locking wedges 28 laterally spaced at its lower edge. For simplicity's sake, the attachment carrier is conveniently referred to as a toe-heel attachment carrier since it has a toe and a heel that are fundamental to its structure (whether by way of a framing or by the use of solid metal material to create the toe and heel carrier features).

The ease with which the attachment carrier 20 can be elevated and tilted by hydraulic rams on the front end loader should be especially noted. Also, the ease with which the attachment carrier can be shifted laterally by independently driving the hweels 8 on opposite sides of the body 9 should be noted.

Referring to FIGS. 1–3, a preferred feature of the hydraulically operable hitch attachment 10 is a base plate 30 having opposite face sides 32, 33 and lateral edges 34, 35 and an upper edge 36 and a lower edge 37. On one face side of the base plate is the toe-heel receiver 40 that is adapted to receive the toe-heel attachment carrier of the front end loader. On the other face side is a hydraulically operable hitch of this invention.

The toe-heel receiver 40 has a toe receiver portion or part formed by an upper lip flange 42 (see FIG. 1) that projects rearwardly from the upper edge 36 of the base plate 30, suitably at an acute angle with respect to the side of the base plate that has the toe-heel receiver 40. The heel part of the toe-heel receiver is formed by a lower lip flange 44 projecting rearwardly from the lower edge 37 of the base plate to form an obtuse angle with respect to the side of the base plate forming the toe-heel receiver. The upper lip flange 42 and the lower lip flange 44 need not extend continuously along the upper and/or lower edges of the base plate. It is only important to have the flange extend sufficiently to serve as a mate for receiving the mateable parts of the toe-heel attachment carrier. An important feature of the heel flange 44 of the toe-heel attachment carrier is that it should have an opening 46 (and preferably an additional opening 47) for receiving a locking means or wedge 28 or wedges carried by the toe-heel attachment carrier. Thus, the toe edge 24 of the attachment carrier is inserted by an operator of the front end loader into the toe receiver portion 42 of toe-heel receiver 40 and the heel portion of the attachment carrier 20 is inserted in the heel receiver portion 44 of the toe-heel receiver 40, followed by extending a plunger or a lock wedge or other locking means 28 into an opening 46, 47 of the heel receiver portion 44. The toe-heel attachment carrier of the front end loader is thus fixed to the toe-heel receiver 40 of the hydraulically operable front end hitch attachment 10, with the toe-heel receiver 40 effectively mounted upon the toe-heel attachment carrier 20 and locked to the attachment carrier so that adjustment of the attachment carrier effectively adjusts the entire hydraulically operable front end hitch attachment of the invention as a unit in both tilt and elevation, as well as in lateral movement effected by skid steering of the front end loader.

Lateral edges 34 and 35 of the base plate are suitably equipped with guidance flanges 48, 49 (see FIGS. 1, 2, and 3) projecting a short distance rearwardly and suitably angularly outward from the lateral edges 34,35. The function of such guidance flanges is simply to assist accurate registration of the toe-heel attachment carrier 20 on the toe-heel receiver 40 at the time the two are mounted together.

As used herein, the term "edge" in "lateral edge" for edges 34 and 35 and the term "edge" in "upper edge" 36 as well as "lower edge" 37 all refer to the operable perimeter of the base plate 30. The base plate need not be larger than those edges, as illustrated, although it would not depart from the invention to employ even larger plate sizes beyond such a perimeter (and thus needlessly incur the extra expense in doing so). The critical point is that the term "edge" refers to the size of the plate that is important for the functions described, and particularly for the mounting on the carrier 20. That size is generally determined by the characteristics of the toe-heel attachment carrier of a front end loader. Illustratively, an ideal base plate will have a width between its lateral edges of about 44 inches and the height between its upper and lower edges of about 17 or 18 inches. While the lateral width of the base plate can vary tremendously, the height generally will not vary outside of a range of 15 inches up to 25 inches even when specially modified for an unusual toe-heel attachment carrier for a front end loader. Further, the term "plate" for the new attachment is intended to embrace variations of structures including frame elements. Preferably, however, the base plate 30 will be of continuous metal structure as distinct from a frame type.

On the hitch face side 33 of the base plate 30 are details of features for the new hydraulically operable pressure hitch, and these detailed features in essence comprise a draw bar assembly 50, a hydraulic ram assembly 60, a boom 70 for suspending the hydraulic ram assembly, and a mid-level assembly 80.

The draw bar assembly has a draw bar 50 that extends perpendicularly outward from the hitch face side 33 of the base plate 30 opposite the toe-heel receiver side 32. (The hitch side sometimes is called the "other" side when the toe-heel receiver side is referred to as the "one" side or first side.) The draw bar 50 has an inner end section 50a that is hollow and permanently united in a rigid manner to the base plate 30 at a medial location between the lateral edges 34, 35 of the base plate and proximate to (i.e., close to) the lower edge 37 of the base plate 30. It is not absolutely critical to have the inner end at a location exactly on the lower edge of the base plate. But it is important to have the draw bar 50 extend from the base plate at some location rather close to the lower edge 37 of the base plate simply because of the added structural features that must be separately supported above the draw bar 50. Draw bar 50 has an outer end section 50b equipped with a basic ball hitch 100. The outer end section 50b of the draw bar 50 is telescopingly received within the hollow inner end section 50a, and the outer and inner end sections are bolted rigidly together by nut and bolt 50c. The distance of the ball hitch from the base plate can vary, but it generally should be at least about 15 inches and not over about 30 inches. A good distance is about 20 to 22 inches.

The forces to which a draw bar is subjected can be immense. For that reason, bracing of the draw bar is highly desirable, and the bracing as illustrated in FIGS. 1 and 2 is commendable. Lateral brace arms 54, 55 are permanently united laterally on the inner end section of the draw bar at a location between the ends of the draw bar and extend to, and are permanently rigidly affixed at, locations on the base plate spaced laterally away from the draw bar inner end at its welding to the base plate. (The bracing is triangular, with the draw bar as one leg, the lateral brace arm as another, and the base plate as the final leg of the triangle.) Welding is a common expedient to accomplish rigid permanent attachment; but with advances in technology, it may not be unheard of to have components made of plastics that resemble metal and have permanent unions or affixation of parts by adhesives as distinguished from welds. An upper brace arm 56 is permanently united to the inner end section of the draw bar and angularly extends upward from the draw bar to a location on the base plate above the inner end section of the draw bar. Brace arms 54, 55, and 56 are designed to effectively brace the draw bar in a strong rigid condition with respect to the base plate.

Hydraulic ram assemblies are extremely well known and can take a variety of specific forms. A useful hydraulic ram assembly 60 for practicing the invention is one having a hydraulic cylinder 62 at one end and a hydraulic ram 66 at the other end. The cylinder end is equipped with a terminal structure 63, and it is from this structure 63 that the ram assembly is suspended. The ram end 66 is extensible and retractable with respect to the cylinder and is equipped with a terminal structure comprising a threaded nut 114, sleeve 112, and rubber pressure stub 110 as above described.

A boom 70 for the hitch side of the base plate is rigidly united at its inner end to the base plate at a location proximate to the upper edge of the base plate. The location need not be exactly at the upper edge, but it should be close to the upper edge 36. Further, the location proximate to the upper edge 36 should be directly above the end of the draw bar 50 united to the base plate. The boom projects angularly upward and outward from the base plate from its permanent rigid mounting to the base plate. The outer end of the boom ends up at an elevated location above the upper edge 36 of the base plate and above the ball hitch of the draw bar. The upward slope of the boom from the welded mounting of its inner end to the base plate is quite gradual, but is at least 10 degrees and preferably in the range of about 20 to 25 degrees but generally need not be more than 35 degrees above an imaginary line perpendicularly outward from the base plate from the welded inner end of the boom. To be noted is the fact that a vertical plane extending the length of draw bar 50 and bisecting draw bar 50 would also bisect boom 70 in the ideal and most preferred practice of this invention.

Boom 70 at its outer end has a hole extending horizontally and transversely through it. The hole is not shown in the drawings, but the pin shaft 64 of a bolt extends through holes in the bifurcated or forked terminal structure 63 and through the hole in the outer end of boom 70. That pin shaft 64 is fastened against dislodgment during use of the hitch, and a suitable fastening may be by way of a nut 65 or the like. The upper end of the hydraulic cylinder (carrying terminal structure 63) may be referred to as the butt end of the hydraulic cylinder, and the opposite end of the hydraulic cylinder from which the ram rod is extensible and retractable may be referred to as the head end 61. Between the head end 61 and butt end 63, strengthening rods 59 (one at each quadrant about cylinder 62) may be employed to hold the head and butt ends together, if desired.

Of great significance is that the hydraulic ram assembly 60 of cylinder 62 and ram 66 and associated elements is removably mounted at its butt end or terminal structure 63 in a suspended condition from the outer end of boom 70 and forms an acute angle with respect to boom 70 because of its suspended condition.

But the hydraulic ram assembly is not allowed to swing like a pendulum from its suspended mounting on pin shaft 64. Instead, that assembly is held in condition for vertical movement of the ram and rubber pressure stub.

The mid-level assembly 80 has a bracing structure 82, 83 mounted to the base plate 30 at a location proximate to the union of the inner end of the boom 70 to the base plate and clearly well above the inner end of the draw bar. This bracing structure extends outward from its inner end mounting to a circumscribing base structure that surrounds the hydraulic cylinder at a location spaced downwardly from its suspension mounting. The circumscribing bracing structure illustratively may be made up of laterally spaced bracing arms 82 and 83 of the mid-level assembly 80 and cross braces 84, 86 to hold cylinder 62 against shifting pendulum movement. (The illustrative mid-level arm 80 is an inverted U-shaped beam with sides 82 and 83 serving as brace arms.) Cross brace 84 and brace arms 82 and 83 form a U-shaped space or recess that accommodates the cylinder 62. At the outer end of the brace arms 82 and 83 is a removable link 86 capable of being temporarily removed to allow removal of the hydraulic ram assembly from the mid-level bracing structure and replacement of a different hydraulic ram in the mid-level bracing structure. (Of course, the suspension mounting on the boom 70 also permits such replacement.) It is this mid-level bracing structure that holds the hydraulic ram assembly in stable condition effectively aligning the extension and retraction of the ram and rubber pressure stub vertically toward and away from the basic ball hitch.

Hydraulic conduits 90 and 92 provide for the movement of hydraulic fluid through elbows 91 and 93 as it enters and exits cylinder 62 (depending, of course, upon the direction of the fluid flow to effect extension and retraction of the ram 66). A stabilizer 94, preferably in the form of a pressure relief valve, may be employed for the hydraulic lines. The pressure set for the stabilizing pressure relief valve may be 100 pounds per square inch, as preferred, but higher (or lower) pressure limits may be set when conditions warrant. An emergency maximum relief pressure of about 500 pounds per square inch should normally be set for the valve 94. The relief afforded by the valve simply recycles the hydraulic fluid from the power source on the towing vehicle back to the reservoir on the towing vehicle. The conduits 90 and 92 are connectable to an auxiliary hydraulic system on the front end loader and are controlled by an operator from a switch in the cab of the front end loader. Many details are not illustrated in the drawing since the operator-controlled auxiliary hydraulic system of a front end loader is well known to those skilled in the art.

What is significant, however, is that the control of the new front end hydraulically operable hitch attachment by an operator from the cab of a front end loader permits the operator to couple and uncouple ball and socket hitching components of unmatched sizes while the operator remains in the cab of the front end loader. This permits a considerable saving of time for an operator who has to hitch and unhitch a multitude of vehicles equipped with ball and socket hitching components. In fact, it saves a considerable amount of time also for an operator who simply has to hitch and unhitch a single towable vehicle. Heretofore, as a practical matter, the operator has dismounted from the cab of the towing vehicle to complete manual coupling of the inverted cup-shaped sockets on ball hitches. As is well known, the tongues of towable vehicles frequently are provided with depending foot supports (or stops or springs) to keep the tongue somewhat elevated and in readiness for coupling to a towing vehicle. This invention permits the operator to view from the cab of the towing vehicle the exact location of the inverted cup-shaped socket on a towable vehicle so as to move the ball hitch of the towing vehicle accurately under the socket of the towable vehicle and lift the ball hitch into the socket and then hold the ball and socket in coupled condition by lowing the rubber pressure stub to a pressure condition against the upper outer surface of the socket—all without getting out of the cab of the towing vehicle.

Sometimes special function hitches may be needed for moving some types of towable vehicles. As shown in FIG. 2, an optional additional ball hitch 130 may be mounted at an elevated location or pinnacle 131 of a frame structure consisting essentially of lateral brace arms 132, 133 (extending to plate 30), and a stabilizer leg (or pair of legs 134, 135) extending between the pinnacle 131 and the outer end of boom 70. Optionally, the shank 136 carrying the ball hitch 130 (as well as any fastener for holding the shank in position) may be removed (to thus remove the ball hitch), which then leaves a hole available for a further option for a hitching arrangement. Still further, the optional ball hitch 130 and its assorted frame may be totally removed (or omitted from the structure in the first place). If removed or omitted, the option exists for an additional ball hitch 140 to be bolted in a nested condition at the intersection of the boom 70 and plate 30. The benefit of optional hitching arrangements is significant for vehicles having towable hitch arrangements that are elevated considerably above ground level (e.g., those commonly known as "fifth wheel").

Further, those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims; and all variations that come within the meaning and range of equivalency of the claims are intended to be embraced thereby.

That which is claimed is:

1. A hitch assembly that permits an operator to pressure couple a towable vehicle to a towing vehicle while the operator remains in the cab of the towing vehicle, said hitch assembly comprising a towing hitch arrangement on the towing vehicle and a towed hitch arrangement on the towable vehicle, wherein said towing hitch arrangement consists essentially of a basic ball hitch and a vertically orientable hydraulically operated ram assembly having a hydraulic ram equipped with a rubber pressure stub at its lowermost end in an orientation above said basic ball hitch for hydraulic movement of said rubber pressure stub vertically toward and away from said basic ball hitch, and wherein said towed hitch arrangement consists essentially of an inverted cup-shaped socket for coupling on said basic ball hitch, said socket having an upper outer surface, said ram's rubber pressure stub being adapted to be vertically moved toward and pressed against the upper outer surface of said inverted cup-shaped socket to hold said cup-shaped socket on said basic ball hitch without scratching said upper outer surface regardless of the contour of said upper outer surface and regardless of pivot movement of said upper outer surface against said rubber pressure stub during towing operations, there being no need for any tightening of the cup-shaped socket to form a grip about said basic ball hitch, whereby the direct vertical application of pressure by said rubber pressure stub on said upper outer surface of said cup-shaped socket constitutes the sole feature for holding said cup-shaped socket against separation from said basic ball hitch.

2. The hitch assembly of claim 1 wherein said cup-shaped socket has an internal diameter greater than the external diameter of said basic ball hitch, but not greater than about two times the diameter of said basic ball hitch.

3. The hitch assembly of claim 1 wherein said rubber pressure stub comprises hardened rubber that resists compression in excess of twenty percent in the vertical direction.

4. The hitch assembly of claim 1 wherein said rubber pressure stub comprises synthetic rubber.

5. The hitch assembly of claim 1 wherein said rubber pressure stub comprises neoprene rubber.

6. The hitch assembly of claim 1 wherein said rubber pressure stub has a transverse width in all transverse directions between about three-eighth inch and two inches.

7. The hitch assembly of claim 1 wherein said rubber pressure stub has a length in the vertical direction of at least one-eighth inch.

8. The hitch assembly of claim 1 wherein said basic ball hitch is capable of being removed from said towing vehicle so as to permit mounting a different towing hitch arrangement on said towing vehicle for coupling with a towed hitch arrangement different from a cup-shaped socket.

9. The hitch assembly of claim 1 in combination with at least one additional hitch arrangement mounted at an elevated location on said towing vehicle spaced laterally away from said vertically orientable hydraulically operated ram assembly.

10. The hitch assembly of claim 1 wherein said basic ball hitch is on a draw bar extending outward from one face side of a vertically orientable base plate having opposite face sides, and wherein said vertically orientable hydraulically operated ram assembly has a hydraulic cylinder end equipped with an upper terminal structure by which said ram assembly is vertically suspended from the elevated outer end of a boom rigidly united at its inner end to said one face side of said base plate and projecting angularly upward and outward from said base plate to an elevated outer end located above said basic ball hitch on said draw bar, and a mid-level bracing structure for holding said ram assembly in stable condition for said hydraulic movement of said rubber pressure stub vertically toward and away from said basic ball hitch.

11. The hitch assembly of claim 10 in combination with at least one additional towing hitch arrangement mounted at an elevated location on said towing vehicle at a location spaced laterally away from said vertically orientable hydraulically operated ram assembly.

12. The combination of claim 11, wherein said additional towing hitch arrangement is fixed on an elevated frame supported on said base plate and said boom.

13. The hitch assembly of claim 1 wherein said towing vehicle comprises a front-end loader equipped with a tow-heel attachment carrier to which a vertically orientable base plate having opposite face sides is mounted so that one face side of said base plate is outermost from said toe-heel attachment carrier, and wherein said basic ball hitch is on a draw bar extending outward from said one face side of said vertically orientable base plate, and wherein said vertically orientable hydraulically operated ram assembly has a hydraulic cylinder end equipped with an upper terminal structure by which said ram assembly is vertically suspended from the elevated outer end of a boom rigidly united at its inner end to said one face side of said base plate and projecting angularly upward and outward from said base plate to an elevated outer end located above said basic ball hitch on said draw bar, and a mid-level bracing structure for holding said ram assembly in stable condition for said hydraulic movement of said rubber pressure stub vertically toward and away from said basic ball hitch.

14. A method of pressure hitching a towable vehicle to a towing vehicle while the operator of the towing vehicle remains in the cab of the towing vehicle, comprising forming on said towing vehicle a towing hitch arrangement consisting essentially of a basic ball hitch and a vertically orientable hydraulically operated ram assembly having a hydraulic ram equipped with a rubber pressure stub at its lowermost end in an orientation above said basic ball hitch for hydraulic movement of said rubber pressure stub vertically toward and away from said basic ball hitch, forming on said towable vehicle a towed hitch arrangement consisting essentially of an inverted cup-shaped socket having an upper outer surface, adjusting said towing hitch arrangement with respect to said towable vehicle by moving said towing vehicle so as to cause said basic ball hitch to enter said inverted cup-shaped socket of the towed hitch arrangement on the towable vehicle, and vertically moving said rubber pressure stub of said hydraulically operated ram assembly to press said stub against the upper outer surface of said inverted cup-shaped socket and thus hold said cup-shaped socket in coupled relationship on said basic ball hitch without scratching said upper outer surface of said socket regardless of the contour of said upper outer surface and regardless of the pivot movement of said upper outer surface against said rubber pressure stub during towing operations, there being no need to tighten the cup-shaped socket to form a grip about said basic ball hitch, whereby the direct vertical application of pressure by said rubber pressure stub on said upper outer surface of said cup-shaped socket constitutes the sole feature for holding said cup-shaped socket against separation from said basic ball hitch during towing operations.

15. The method of claim 14 wherein the step of forming a towing hitch arrangement on the towing vehicle involves forming the towing hitch arrangement on a front-end loader capable of tilting the towing hitch arrangement and moving the towing hitch arrangement horizontally and vertically.

* * * * *